Feb. 15, 1966   M. A. HALL   3,235,054
COIN CHUTE MECHANISM
Filed Feb. 21, 1963   9 Sheets-Sheet 1
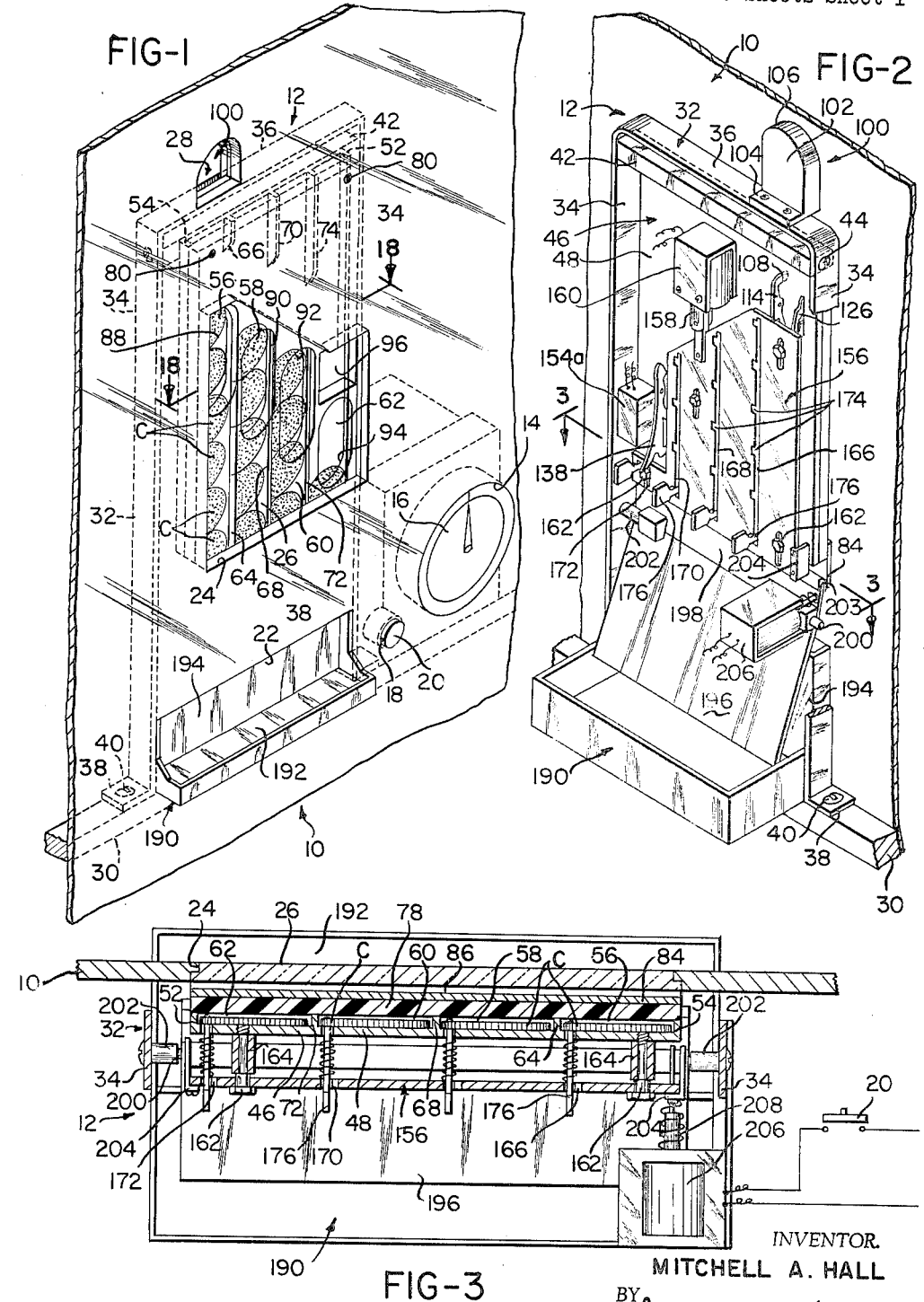
INVENTOR.
MITCHELL A. HALL
BY
*J. Warren Kinney Jr.*
ATTORNEY Feb. 15, 1966 M. A. HALL 3,235,054
COIN CHUTE MECHANISM
Filed Feb. 21, 1963 9 Sheets-Sheet 2
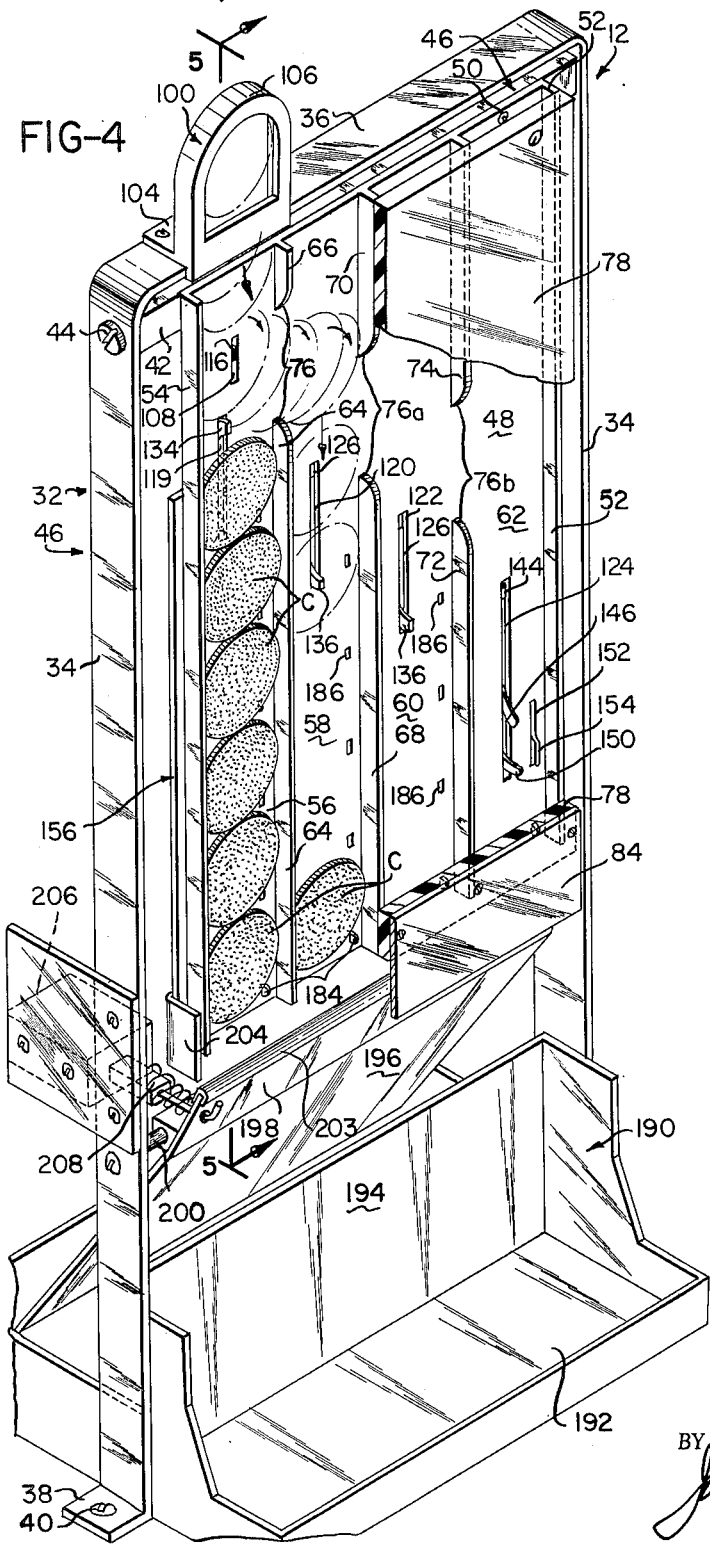
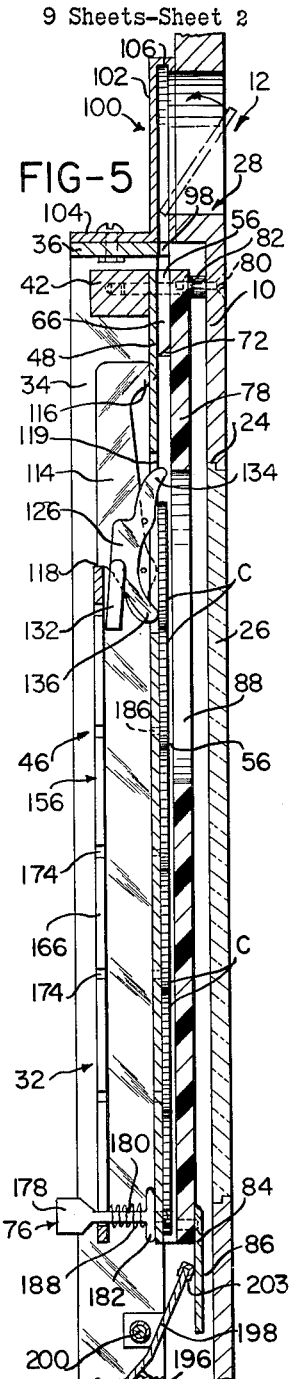
INVENTOR.
MITCHELL A. HALL
BY
ATTORNEY Feb. 15, 1966   M. A. HALL   3,235,054
COIN CHUTE MECHANISM
Filed Feb. 21, 1963   9 Sheets-Sheet 3
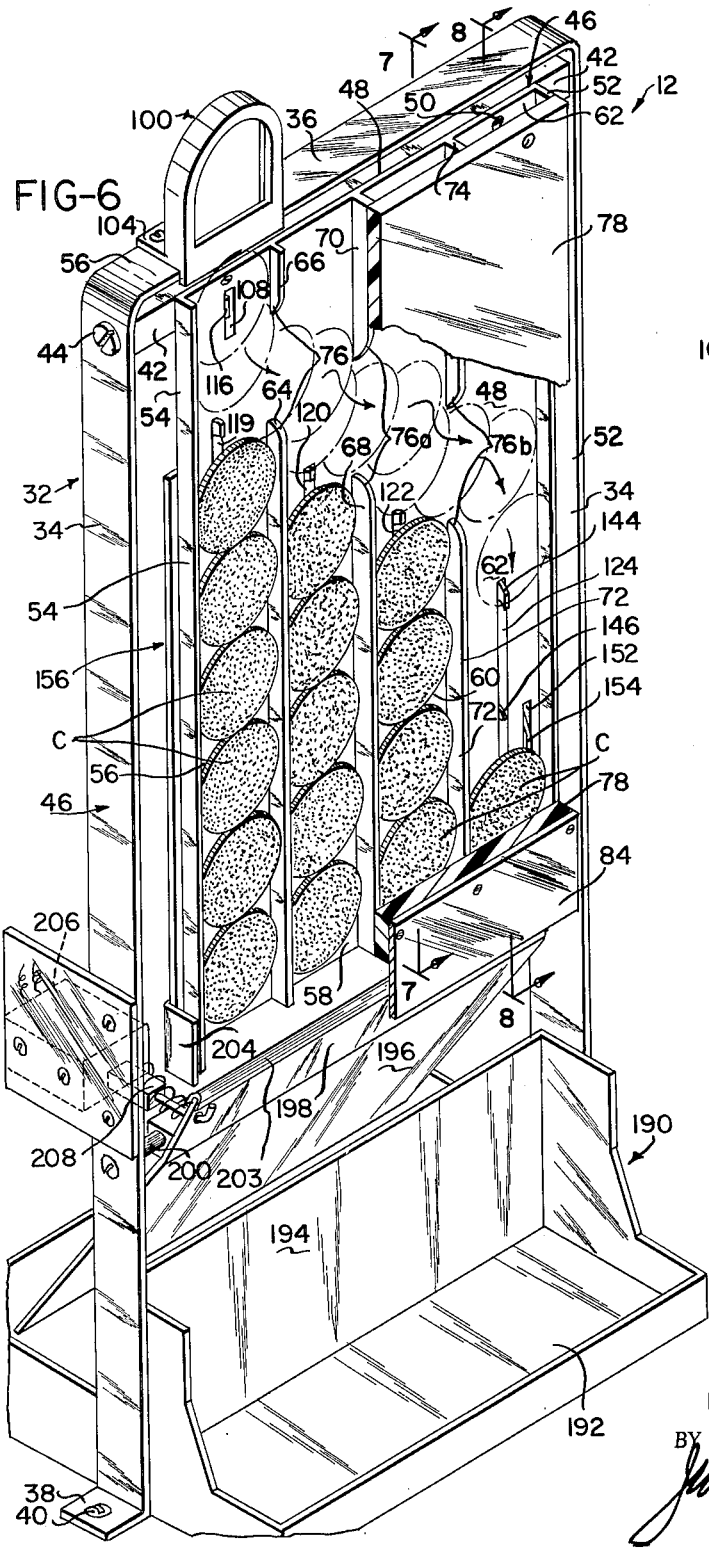
INVENTOR.
MITCHELL A. HALL
BY
J. Warren Kinney Jr.
ATTORNEY

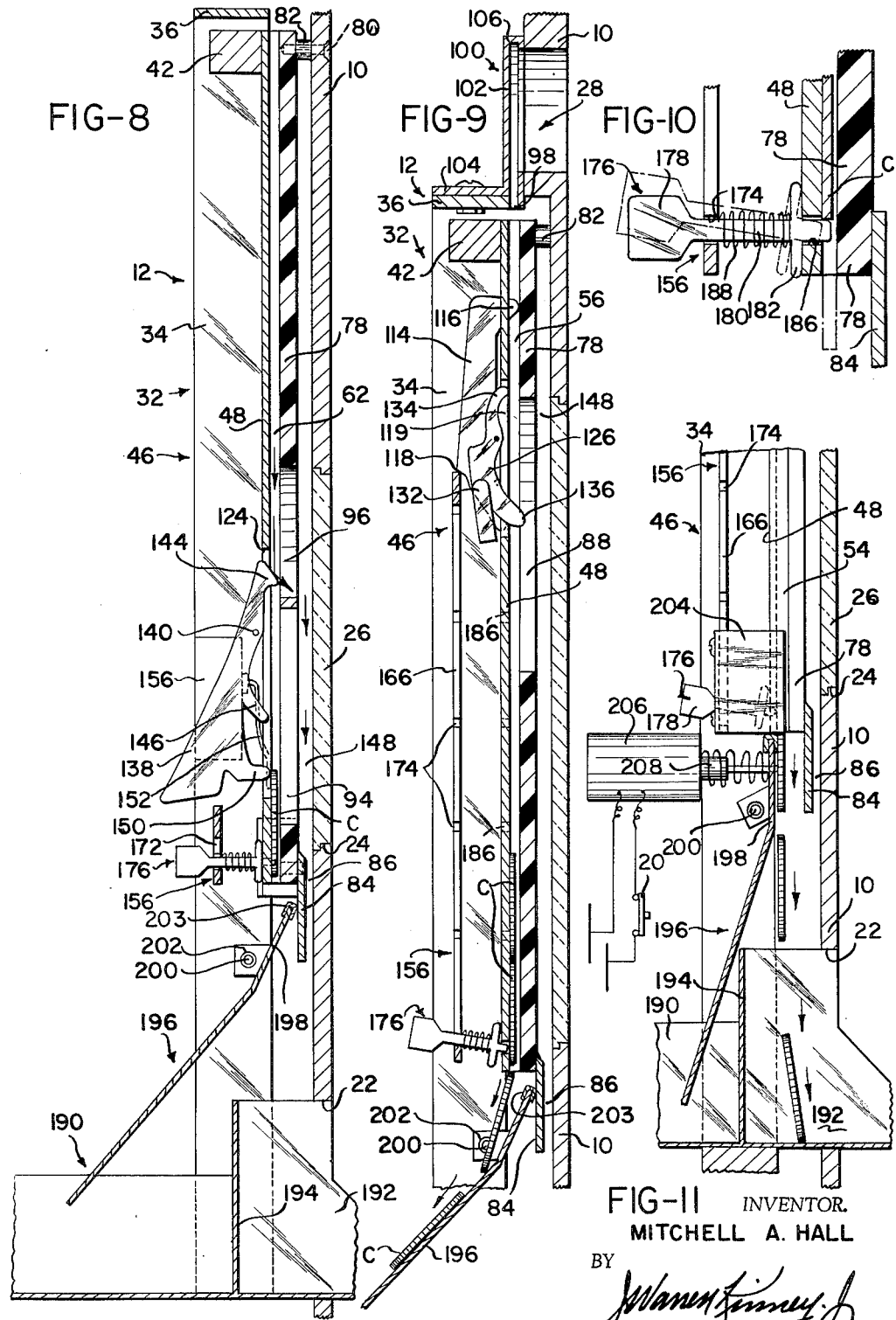

Feb. 15, 1966 M. A. HALL 3,235,054
COIN CHUTE MECHANISM
Filed Feb. 21, 1963 9 Sheets-Sheet 5

INVENTOR.
MITCHELL A. HALL
BY
ATTORNEY

Feb. 15, 1966   M. A. HALL   3,235,054
COIN CHUTE MECHANISM
Filed Feb. 21, 1963   9 Sheets-Sheet 6
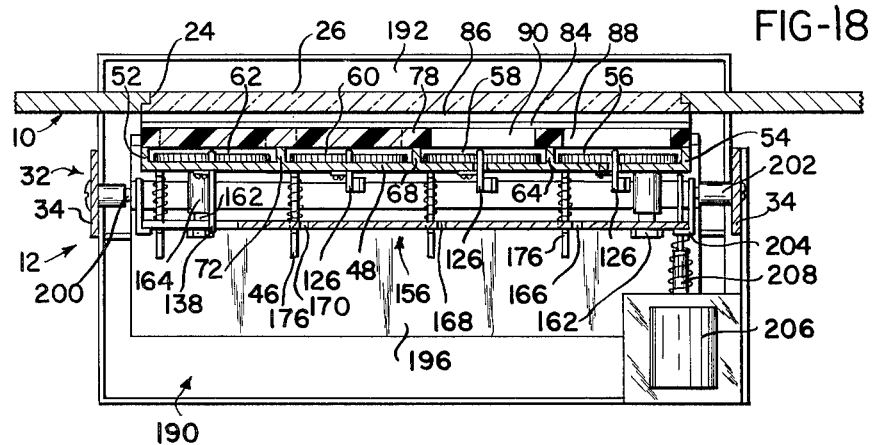
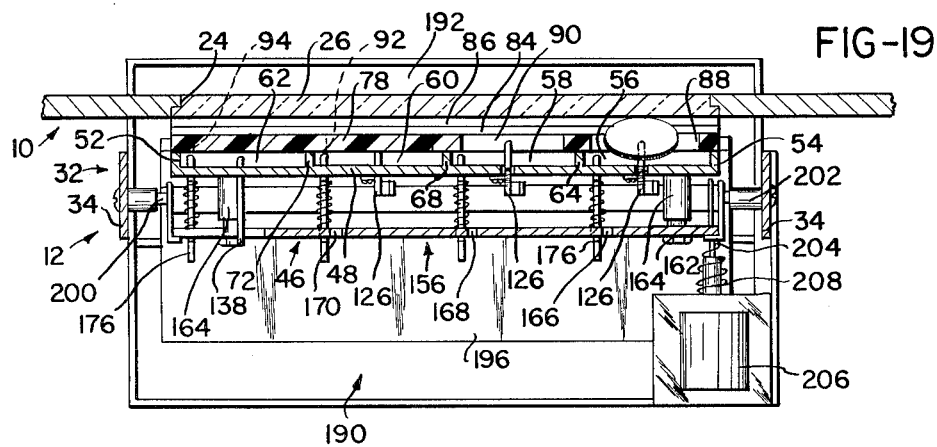
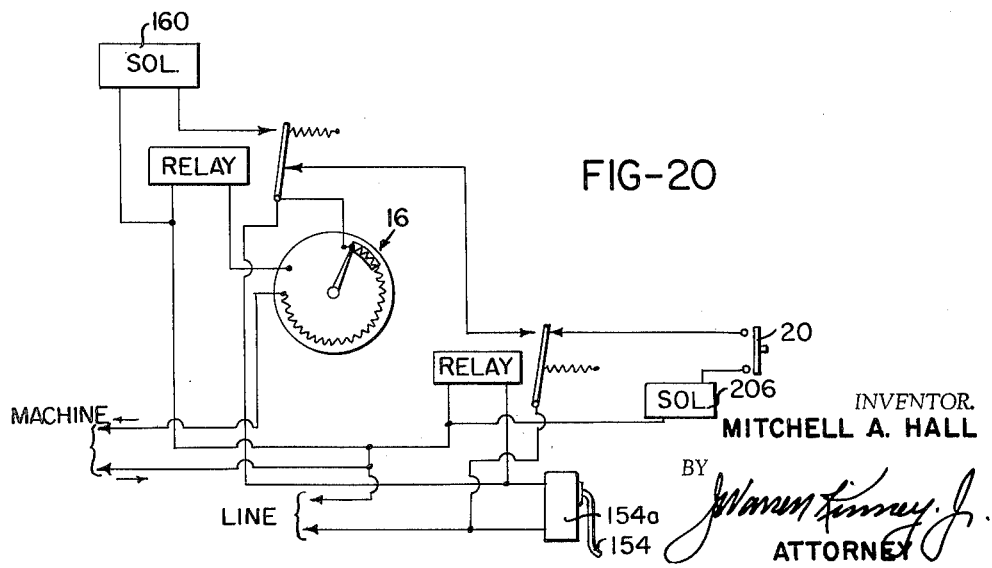
INVENTOR.
MITCHELL A. HALL
BY
ATTORNEY

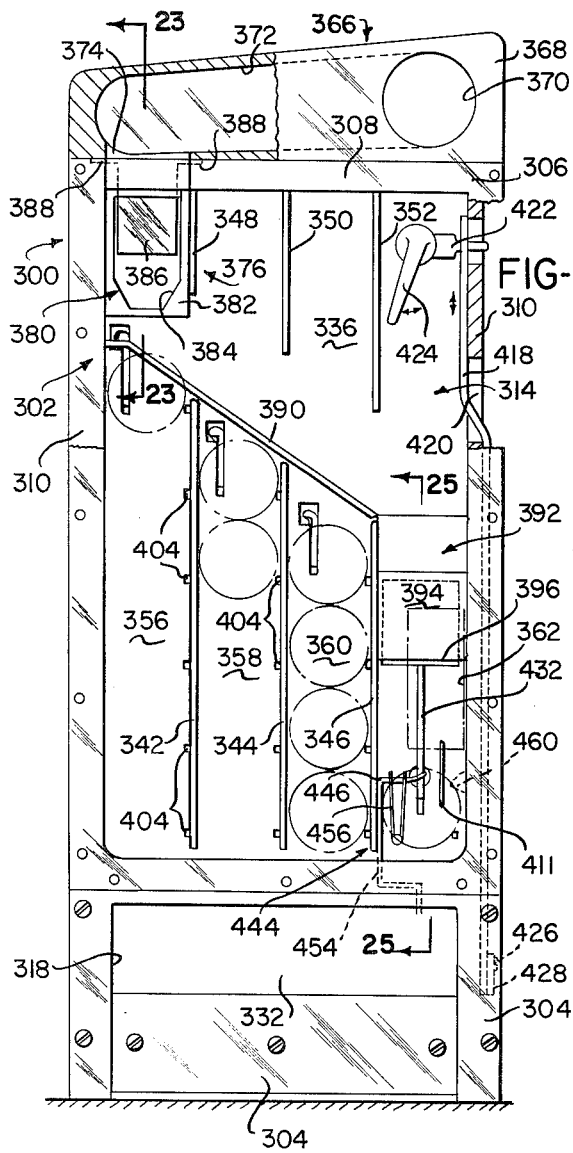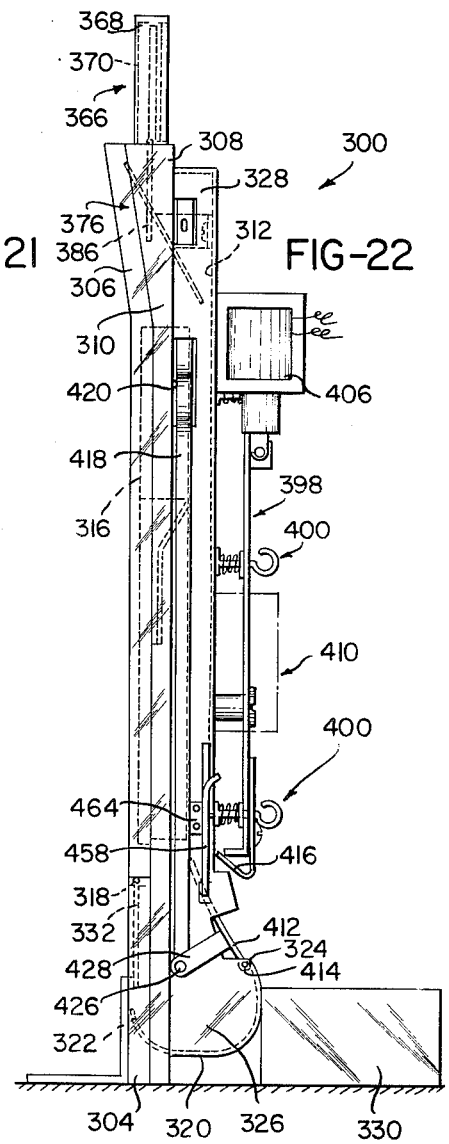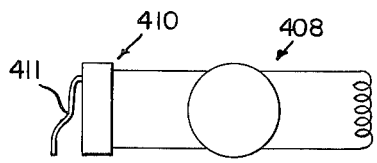

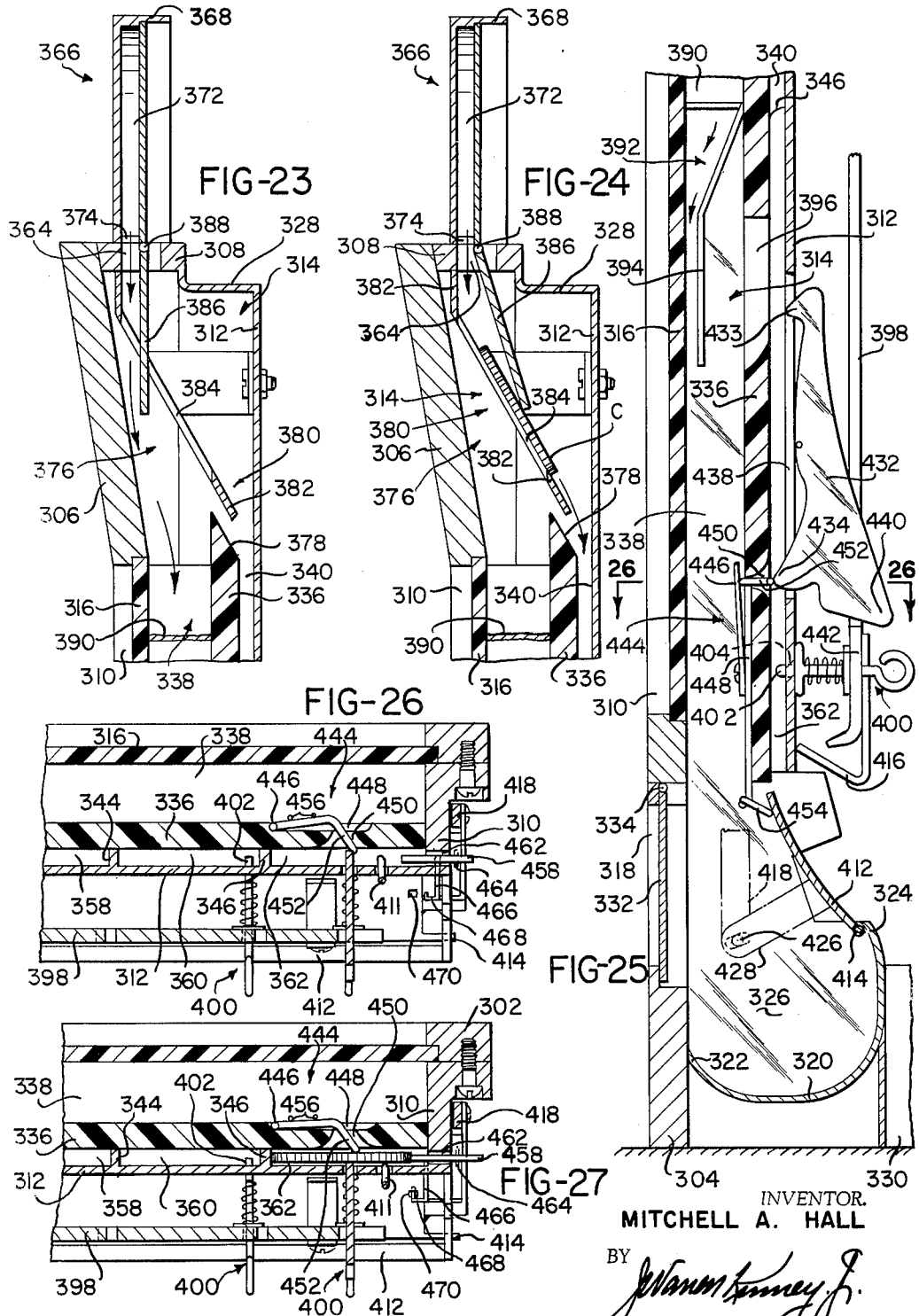

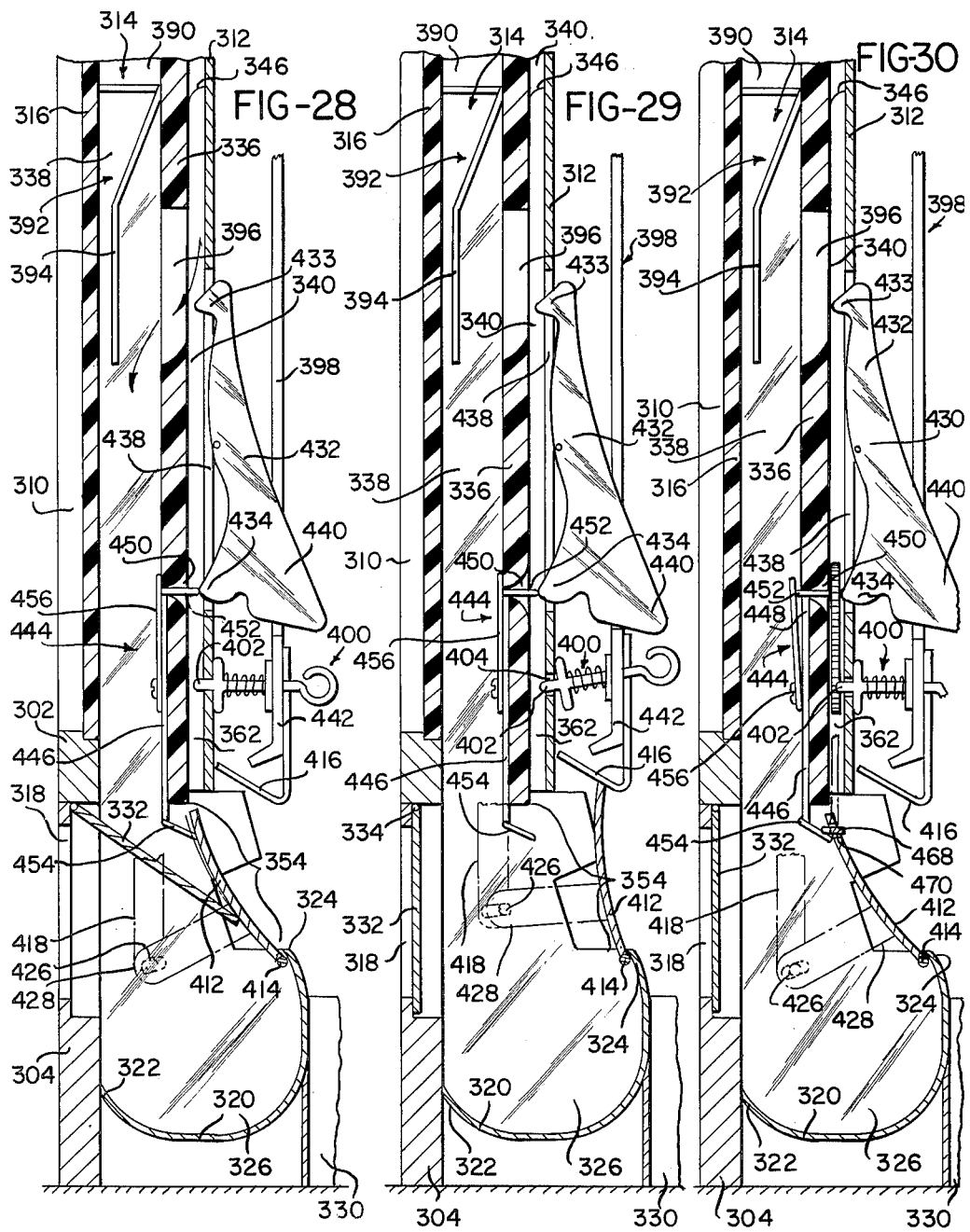

United States Patent Office 3,235,054
Patented Feb. 15, 1966

3,235,054
COIN CHUTE MECHANISM
Mitchell A. Hall, 445 Rossford Ave., Fort Thomas, Ky.
Filed Feb. 21, 1963, Ser. No. 260,109
26 Claims. (Cl. 194—9)

This invention relates generally to improvements in coin chutes, and is directed particularly to a novel coin chute construction of the type which will receive and accumulate a plurality of similar coins or similar tokens for the purpose of initiating the operation of a device controlled thereby.

One of the objects of the present invention is to provide a coin chute construction having means associated therewith for accumulating a predetermined number of similar coins or similar tokens whereby to initiate a subsequent event, but the start of which is not to occur until after the predetermined number of coins or tokens have been accumulated in the chute device.

Another object of the invention is to provide a novel coin chute construction for accumulating a predetermined number of similar coins or similar tokens, wherein the number of such coins or tokens required to initiate a subsequent operation, may be changed by authorized personnel without requiring the use of skill and/or special tools.

A further object of the invention is to provide a coin chute mechanism having the hereinabove described characteristics and which includes means for maintaining each of the coins or tokens and/or each of a predetermined number of coins or tokens in a fully exposed position during the entire period of a timing cycle initiated by the accumulation of a predetermined number of coins or tokens in the mechanism. In other words, the subject device or mechanism will maintain on display and in clear view of the public, all of the various coins or tokens which a user of the device has inserted into the coin chute for the purpose of renting the facilities of another device or machine, the operating characteristics of which are controlled by the coin chute mechanism.

A still further object of the invention is to provide a coin chute mechanism having means for accumulating coins or tokens up to a predetermined number for automatically initiating a timing cycle; said coin chute mechanism including manually operable means under the control of a patron, which may be actuated for releasing and returning all coins in the coin storage or collecting portion of the chute mechanism, short of the predetermined number required to initiate the said timing cycle.

It is a rather common occurrence in the use of coin controlled equipment such as, by way of example, washers, dryers, dry cleaning equipment, and the like, where the operating characteristics of such coin controlled equipment is to be determined by a timer under the control of a coin chute which requires insertion of a predetermined number of similar coins or tokens in order to initiate a timing cycle, for a patron to run out of coins or tokens before the required number have been inserted. Heretofore, coin chutes have had no means for enabling a patron to retrieve the coins or tokens, less than the number required to initiate the timing cycle, from a coin chute. The present coin chute mechanism includes simple yet highly effective or efficient means for enabling a patron to retrieve coins or tokens inserted into the mechanism at any time prior to the insertion of the last of a predetermined number of coins or tokens as required to initiate the timing cycle.

Still another object of the invention is to provide a coin chute mechanism, having the hereinabove described characteristics, which includes means for automatically dumping all of the coins which collectively constitute the prerequisite number to initiate a timing cycle, after completion of such timing cycle.

The foregoing and other objects are attained as described in the following specification and disclosed in the accompanying drawings forming a part thereof and wherein:

FIG. 1 is a front view of a control panel carrying the improved coin chute mechanism of the present invention and illustrating the mechanism as having received one less than the prerequisite number of coins or tokens required to initiate a timing cycle.

FIG. 2 is a perspective view of the back of the coin chute mechanism and supporting panel.

FIG. 3 is a transverse sectional view taken in a horizontal plane substantially on the line 3—3 of FIG. 2, and on an enlarged scale.

FIG. 4 is a view in perspective of the front side of the chute mechanism, on an enlarged scale, with the front wall removed and with the major portion of the apertured transparent plate broken away and illustrating in dotted outline, coins being introduced into the mechanism and deflected from the filled first station channel into the second station channel.

FIG. 5 is a vertical section taken substantially on the line 5—5 of FIG. 4.

FIG. 6 is a view in perspective corresponding to FIG. 4 and illustrating in broken outline the path taken by the last coin or token to be introduced after the other or preceding three station channels have been filled.

FIG. 7 is a vertical section taken substantially on the line 7—7 of FIG. 6 looking in the direction of the arrows.

FIG. 8 is a vertical section taken substantially on the line 8—8 of FIG. 6 and showing the coin deflector or throw-out lever held by the last coin, in a position to deflect any additional coins introduced after the mechanism is filled.

FIG. 9 is a vertical section taken approximately on the same vertical section line as FIG. 5 but showing the coin stop pin supporting plate elevated to cam the stop pins to a position to release the coins after completion of the operating cycle.

FIG. 10 is a detail section taken on an enlarged scale and illustrating the movement imparted to the coin stop pins by elevation of the supporting plate.

FIG. 11 illustrates the camming action of the coin deflector plate by the energization of the coin release solenoid, for release and return of coins to the coin return tray when the coin return button is operated before the last or the required number of coins has been introduced into the mechanism.

FIG. 18 is a horizontal section taken substantially on the line 18—18 of FIG. 1.

FIG. 19 is a horizontal section corresponding to FIG. 18 but without showing coins collected in the stations but illustrating the deflection of an improper coin into the coin reject or ejecting space.

FIG. 20 is a diagram of a control circuit for the electrical elements.

FIG. 21 is a view in front elevation of a modified construction, showing parts thereof in section and parts broken away.

FIG. 22 is an edge or side elevational view of the modified construction of FIG. 21.

FIG. 23 is a sectional view, on an enlarged scale, taken substantially on the line 23—23 of FIG. 21, illustrating the path of movement of an improper or incorrect coin or token into the coin return passage.

FIG. 24 is a sectional view corresponding to FIG. 23 and illustrating the path of movement of a coin of correct size or correct token, into a receiving station.

FIG. 25 is a vertical section, on an enlarged scale, taken substantially on the line 25—25 of FIG. 21.

FIG. 26 is a horizontal section taken substantially on the line 26—26 of FIG. 25 and illustrating, like FIG. 25, the novel positions of the coin reject and throw out arm and adjacent elements prior to the introduction of the last operating coin or token into the apparatus.

FIG. 27 is a sectional view corresponding to FIG. 26 but showing a final coin in the apparatus and its engagement with the circuit closing switch, the coin throw out arm, the means for locking against movement the manual coin return mechanism and the means for securing the coin chute panel in position for deflecting coins from the apparatus into the coin box.

FIG. 28 is a vertical section corresponding to FIG. 25 and illustrates the coin tray access door in open position and also illustrates the path of movement taken by coins to be returned after the apparatus is filled.

FIG. 29 is a sectional view corresponding to FIG. 27 and illustrates the position of the parts which they assume when the manual means is operated for the return of coins prior to the deposit of the final coin in the apparatus.

FIG. 30 is a vertical section corresponding to the preceding three figures and showing the position of the final coin in the last station and which closes the switch for starting the timing mechanism and also effects the locking up of the chute panel, the manual control and the coin reject and return arm.

FIG. 31 is the timer circuit.

Figure 12:
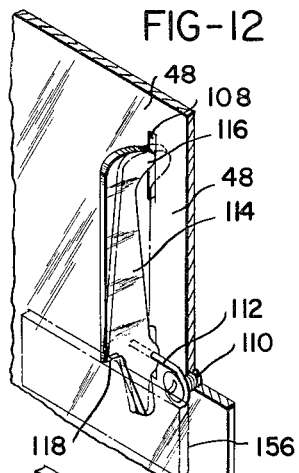
FIG. 12 is a perspective view of the coin lock-up arm located at the top of the first station channel for stopping, when projecting forwardly, the introduction of additional coins while the mechanism is being emptied of coins as shown in FIG. 9.

Two embodiments of the present invention are herein disclosed in which the mode of operation is generally the same but wherein there are differences in some structural details and also in the embodiment first to be described, the means by which the return of coins can be effected prior to the insertion of the last coin, is electrical, whereas in the second embodiment such means is entirely mechanical for manual actuation.

Referring now more particularly to the drawings, the invention in the first embodiment thereof is illustrated in FIGS. 1 to 20.

FIG. 1 shows the front or forward side of a portion of a cabinet or housing wall upon which the coin chute mechanism is mounted, at the rear thereof, FIG. 2 illustrating, in perspective, the rear of the housing or cabinet wall and the mechanism thereon.

The supporting wall for the coin chute mechanism is generally designated 10 and the mechanism at the rear of the wall is generally designated 12.

The wall 10 is provided with a number of openings for exposure of or to give access to certain elements of the mechanism. For example, there is the opening 14, through which the face of a timer mechanism 16 is shown.

Adjacent to the timer mechanism is the opening 18 for the switch button 20 by which the release of coins to be returned to the patron of the mechanism, can be effected before the final coin is deposited, if desired.

The horizontal elongate opening 22 in the wall 10 receives the hereinafter described coin return tray and above the opening 22 is a window opening 24 in which a transparent panel 26 of glass or other suitable material is fitted as particularly shown in FIG. 3, and above the window 26 the wall 10 has a coin entrance opening 28 leading into the coin chute mechanism as hereinafter described and as clearly illustrated in FIG. 5.

The coin chute mechanism 12 is mounted upon or is secured to the rear of the wall 10 in a suitable manner. There is here shown a horizontal rail 30, FIG. 2, upon which the mechanism is mounted. However, it will be understood that this is only illustrative of one convenient way in which the mechanism can be mounted and is not to be understood as in any way limiting the manner of mounting the invention.

As illustrated the mechanism embodies a vertically disposed relatively long rectangular frame which is generally designated 32 and which comprises the vertical, spaced and parallel side bars 34 connected at their upper ends by and preferably formed in one piece with a horizontal top rail 36 while the lower ends of the side bars are outturned as indicated at 38, forming supporting feet which are here shown as resting upon the rail 38 and secured thereto by screws 40.

The numeral 42 designates a bar lying just below and parallel with the frame top rail 32 and secured at its ends as indicated at 44 to the vertical side bars 34.

The numeral 46 generally designates a unit constructed in the manner about to be described, to provide a desired number of vertical coin or token channels or stations. This unit embodies a plate 48 disposed vertically within the frame 32 and secured at its top edge as indicated at 50, to the bar 42.

The plate 48 is boarded along each of its vertical edges with a forwardly projecting flange. The flange at the right hand side of the plate, as viewed from the front of the mechanism, is designated 52, while the flange at the left side of the plate is designated 54.

The forward side of the plate 48 carries a number of pairs of forwardly projecting and vertically extending, vertically spaced and aligned ribs. These vertically extending pairs of ribs are equidistantly spaced across the width of the plate, from each other and from the right and left hand flanges and form vertical coin channels or coin or token stations. The number of such pairs of ribs is here shown as 3 which, in association with the flanges 52 and 54, provide four such coin stations or channels which are numbered, reading from left to right 56, 58, 60 and 62. These coin station channels are open at the top as shown.

The first pair of spaced aligned ribs cooperating with flange 54 to form the first station channel 56, is made up of a long rib 64 extending upwardly from the bottom end of the plate 48, and a short rib 66 extending downwardly from the top edge of the plate and the ribs terminating short of one another, near the top of the plate to form a space therebetween of sufficient size to pass a coin or token.

The next pair of end aligned and spaced ribs cooperating with the ribs 64 and 66 to form the second coin station channel 58, are designated 68 and 70. The rib 68 is also of substantial length and extends upwardly from the bottom edge of the plate 48 but terminates at an elevation below the top end of the adjacent rib 64, while the rib 70 which is longer than the rib 66 extends downwardly from the top edge of the plate 48 to an elevation below the lower end of the rib 66 and terminates short of the upper end of the rib 68 a sufficient distance to provide a coin passing opening between the ends of the ribs.

The third pair of end aligned and spaced ribs cooperating with the ribs 68 and 70 to form the third coin station channel, are designated 72 and 74. The rib 72 is also a long rib extending from the bottom edge of the plate 48 upwardly but it is shorter than the adjacent rib 68 and terminates at an elevation below the top end of the rib 68 as shown, while the rib 74 is longer than the adjacent rib 70, extending downwardly to a point below the elevation of the lower end of the rib 70 and terminates in spaced relation with the upper end of the rib 72 to provide space for the passing of a coin or token as illustrated particularly in FIG. 6.

As will be seen, the third pair of ribs 72 and 74 form in cooperation with the right hand flange 52, the fourth coin station channel 62.

From the foregoing it will be seen that the spacing between the aligned ends of the ribs of each pair forms an open gate leading laterally from one coin station channel to the next, the first gate being designated 76, the second 76a, and the third 76b. These gates are also at progressively lower elevations from left to right and the length of the channels forming the first, second and third stations designated 56, 58 and 60, respectively, will receive up to the respective gates, a decreasing number of coins in a manner hereinafter described.

Overlying the front side of the unit 46 and positioned against the forward edges of the flanges 52 and 54 and of the ribs, is the transparent wall panel 78, here illustrated as formed of plastic, but which may be formed of glass or other desired material.

The wall panel 78 is secured to the casing or housing wall 10, the plate 48 and the bar 42, by screws 80, as shown in FIGS. 5, 7, and 8, being separated from the front wall 10 by suitable spacers 82 as illustrated.

Secured across the bottom of the wall panel 78 and projecting below the same and also spaced from the front wall 10, is an apron strip 84. The space 86 between this apron strip and the front wall 10 provides for the return, in the manner hereinafter set forth, of rejected coins or tokens, that is, coins which may be introduced into the mechanism after the same is filled, or coins of the improper size or denomination.

The wall panel 78 has formed therein the four elongate reject openings 88, 90, 92 and 94. These openings are located in line respectively, or directly in front of the coin station channels 56, 58, 60 and 62 and below the adjacent gates. These openings are for the rejection of coins of smaller size and smaller denomination than the coins or tokens which must be used. Accordingly, the elongate openings 88 to 94, inclusive, may be of a width somewhat smaller than the diameter of the proper size coin or token so that the latter cannot escape from their station channels and the manner of ejecting smaller coins will be hereinafter described.

In addition to the wrong coin ejection opening 94 associated with the fourth station or channel 62, there is the opening 96 located above the opening 94 in the wall panel 78 through which a coin of proper size for use in the mechanism may be ejected by the means hereinafter described, when the mechanism has been filled, or, in other words, when all of the stations have been filled with the proper denomination or proper size coin or token.

Above and in line with the upper end of the first station channel 56, the top rail 36 of the frame is cut out or recessed as indicated at 98 and upon the rail 36 there is mounted a coin or token receiver 100 which, as best seen in FIG. 5, comprises a vertical back wall 102, flanged at its bottom edge as indicated at 104, to rest upon the top of the rail 36 with the bottom edge of the wall 102 positioned so that the face of the wall is aligned with the rear part of the cut-out 98 and the top and sides of the wall 102 are bordered by the flange 106. Thus the coin receiver is in the form of a recess or recessed member which is positioned behind and aligned with the opening 28 in the wall 10 of the machine or mechanism cabinet so that coins introduced into the receiver as illustrated in FIG. 5 can pass downwardly behind the wall panel 78 and into the first station channel 56 as here illustrated.

In the center of the first station channel 56 and opposite approximately the center of the gate 72 the plate 48 has an elongate vertically disposed slot 108 therein.

At the back of the plate 48, at an elevation below the slot 108, a means, shown in FIG. 12 as a screw 110, supports a short transversely extending pivot pin 112.

Upon the pivot pin 112 is mounted the elongate vertically disposed lock-up arm 114. The pivot pin 112 passes through the lower end of this arm and the upper end of the arm has the forwardly directed nose 116 aligned with the slot 108 through which it is projected to lock-up the mechanism when the same has received the proper complete number of coins or tokens to activate the timer 16.

The lower end of the arm 114 is formed on the rear side or rear edge to provide a downwardly directed shoulder 118, the function of which will be hereinafter described.

The arm 114 is so balanced on the pivot pin that the upper or nose end will swing back out of the slot 108 when it is not being positively held projected through the slot.

The plate 48 is provided with a number of vertically extending elongate slots, there being one for each of the respective channels 56, 58, 60 and 62, and these slots are numbered, respectively, 119, 120, 122 and 124.

Each of these last mentioned slots lies in the major extent thereof below the top end of an adjacent rib. That is, the slot 119 lies or extends below the top end of the adjacent rib 64 while the slot 120 lies in the main below the top end of the adjacent rib to the right, numbered 66, and the slot 122 lies or extends in the main below the top end of the adjacent rib to the right thereof, that is, the rib 68.

The slot 124 which is somewhat longer than the other slots lying in the channels, has its top end below the adjacent rib 72 and extends through the major portion of the channel part which extends below the top end of the rib 72 as shown in FIGS. 4 and 6.

Mounted upon the back of the plate 48 in alignment with each of the slots 119, 120 and 122, for oscillation relative to the slot, is a coin stop and deflector arm 126.

Figure 13:
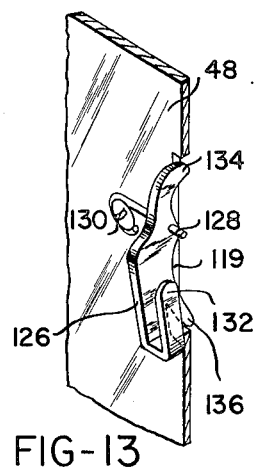
FIG. 13 is a view in perspective of the coin stop and deflector arm, viewed from the rear, positioned at the top of each of the first, second, and third coin channel stations, which, when projected, deflects a coin into the next station.
Figure 14:
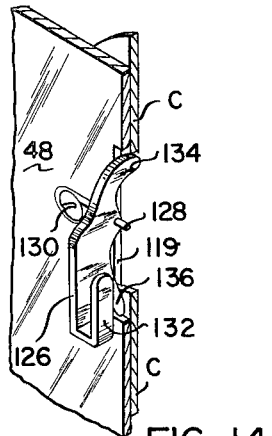
FIG. 14 is a perspective view corresponding to FIG. 13 and showing the coin stop deflector arm projecting at its top end by a coin engaging the lower end thereof to effect the deflection of the coin on the top into the next channel.

The mounting for one of these arms 126 is illustrated in FIGS. 13 and 14 where the slot associated with the arm is designated 119 representing the slot in the first station channel 56. The mounting is, of course, the same for each of the arms connected with the slots 120 and 122.

As illustrated in FIGS. 13 and 14, the arm 126 is, like the arm 114, a long flat body, and this arm 126 is supported for rocking movement upon a pivot pin 128 which is secured at one end to the plate 48 in a suitable manner as, for example, by means of the screw 130 here illustrated, whereby the pin extends across the adjacent slot.

The pivot pin 128 passes through the arm 126 adjacent to the upper end thereof, and the lower end portion of the arm has a length thereof turned up as indicated at 132 to give a counter-balancing weight which will cause the lower end of the arm to swing forward and thereby normally position the forwardly curving upper end nose portion 134 withdrawn from or moved rearwardly in the slot 119, or, in other words, in retracted position.

Each of the arms 126 is also formed to have a downwardly and forwardly curving tail piece 136 and since the arm is counterbalanced so as to swing forwardly at its lower end, this tail piece normally projects through the slot and beyond the forward face of the plate or into the adjacent channel, as illustrated most clearly in FIGS. 4, 9 and 13.

Mounted upon the rear side of the plate 48 in alignment with the slot 124 which opens therethrough into the lower part of the last or fourth station channel 62, is an elongate flat metal coin reject or throw-out arm 138. This arm 138 is formed of flat metal with the forward edge directed toward and partly lying in the slot 124 and this arm is pivotally supported upon the pivot pin 140 which passes transversely through the arm adjacent to the upper end thereof and is secured, in horizontal position, to the back of the wall 48 in a suitable manner as, for example, by means of the screw 142.

The arm 138 is of materially greater width at its lower end than at the upper end as shown, and the upper end is formed to provide the forwardly projecting nose portion 144, the top edge of which slopes forwardly and downwardly as shown. Intermediate the ends of the arm 138 and located below the pivot pin 140 is a forwardly and downwardly inclined or curving throw-out tongue the function of which is to deflect forwardly out of the channel any coins of smaller size or denomination than the ones required to be used. When such smaller coins are inserted into the mechanism and pass into the channel 62, when the arm is in the position shown in FIG. 15 where the nose 144 is retracted into the slot 124 and the tongue is projected through the slot beyond the front face thereof, such coins will be deflected through the opening 94 in the wall panel 78 into the space 148 between this wall and the front wall 10 and will pass downwardly through the space 86 into the hereinafter described coin return tray.

At the bottom end of the arm 138 there is formed the forwardly projecting tail piece 150 which, at all times, projects forwardly through the slot, like the tongue 146, except when the last coin required to operate the mechanism has passed into the last coin station channel 62. Such last coin will strike the tail piece 150 and swing the arm 138 rearwardly and the coin will be stopped, by means hereinafter described, to hold its engagement against the end of the tail piece as shown in FIG. 8 and keep the nose 144 extended forwardly as shown in this figure. As is also shown in FIG. 8, the opening 96 in the wall plate is located so that when the arm is in the position shown in FIG. 8, a subsequent coin introduced into the last station channel 62 will strike the top edge of the nose and be deflected forwardly through the opening 96 and into the return space or passage 148, thereby rejecting the last coin because of the filled condition of the mechanism.

Figure 15:
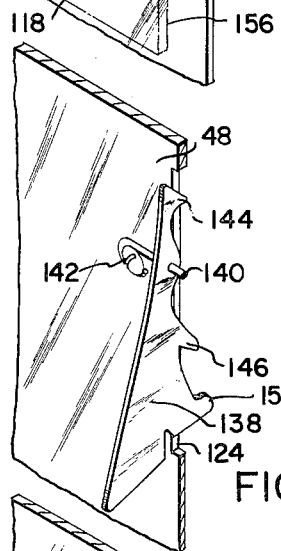
FIG. 15 is a rear perspective view of the pivoted throwout arm for ejecting excess coins introduced after the mechanism is filled and for rejecting improper size coins or tokens which may be introduced into the last channel station.

The increased width or enlargement of the lower end of the arm 138 provides sufficient weight to cause the lower end of the arm to swing forwardly to the position shown in FIG. 15 except when so prevented by a coin in the bottom end of the channel.

The last station channel 62 also has opening into the lower end portion thereof through the wall 48, the vertically extending slot 152 through which projects into the channel, a downwardly projecting switch finger 154 which when depressed or forced rearwardly operates a mercury switch 156 to close an electric circuit putting the mechanism into operation.

In addition to the throw-out tongue 146 of the arm 138 being positioned to deflect small denomination and unacceptable coins forwardly through the opening 94 in the wall plate 148, the tail piece 136 of each stop and deflector arm is positioned as shown in FIGS. 4 and 9 at all times except when the associated station channel is filled with coins, to extend forwardly and downwardly toward the adjacent opening so as to deflect unsuitable coins through the adjacent opening and into the discharge slot 148.

Positioned rearwardly of and in spaced parallel relation with the plate 48 of the unit 46 is a pin supporting plate 156. The pin plate 156 is suspended, as shown in FIGS. 2 and 7 from the armature or core 158 of an electric solenoid 160 which is secured to the back of the plate 48. This solenoid, when actuated, shifts the plate 156 upwardly for the purpose hereinafter described.

The plate 156 is guided in its up and down movement by guide pins 162, secured, as illustrated, in FIG. 3, to the plate 48.

Between the plate 48 and the pin plate 156, the guide pins 162 have spacer sleeves 164 thereon, to further ensure the movement of the plate 156 up and down without movement from a vertical plane.

It will also be seen, in FIGS. 2, 9, and 12, that the shoulder 118 of the lock-up arm 114 lies directly above the top edge of the pin plate. This shoulder and the top edge of the pin plate are normally spaced apart a predetermined distance but the spacing is such that when the pin plate is shifted upwardly as hereinafter described, the shoulder 118 will be engaged and the lock-up arm will be oscillated forwardly as illustrated in dotted outline in FIGS. 9 and 12.

The pin plate 156 has formed therein, a number of vertical notched slots, corresponding to the number of coin station channels 56, 58, 60 and 62 and numbered, respectively, 166, 168, 170 and 172.

One edge of each of these notched slots, here shown as the right hand edge as viewed from the front side of the mechanism, has the series of notches therein.

The single reference numeral 174 is used to designate all the notches of the different slots and the number of notches for each slot corresponds to the number of coins to be introduced into the coin station channel with which the slot is associated. For example, the slot 166 is shown as having six notches 174, and the first station channel 56 behind which the slot 166 is located, is designed to receive ony six coins as shown in FIG. 6. The next slot 168 is shown with five notches and the second station channel, number 58, is accordingly intended to receive only five coins while the third station channel designated 60 is intended to receive four coins but the last station channel receives only a single coin.

The reference character C designates the coins illustrated in the different views.

Each of the notched slots 66 to 72 has positioned therein a coin stop pin 176.

Figure 17:
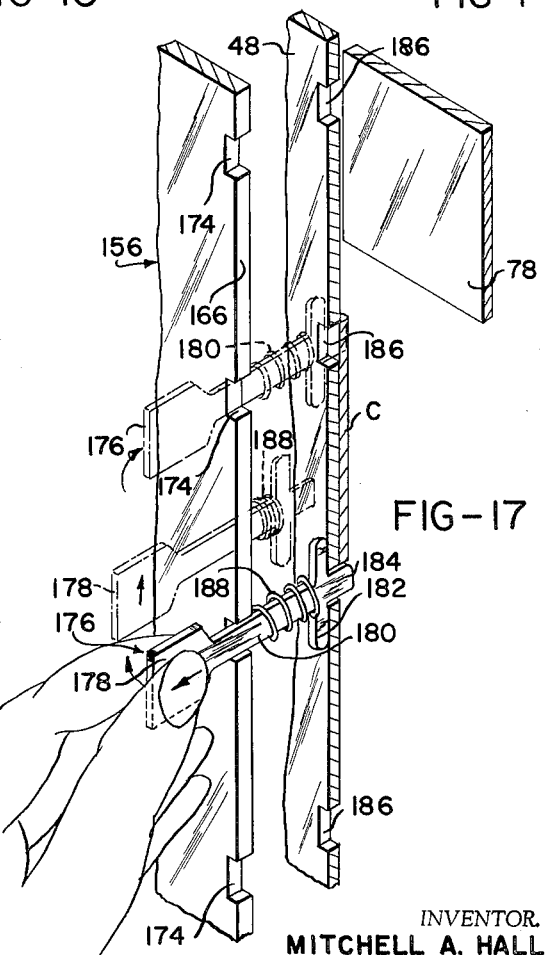
FIG. 17 is a rear perspective view of portions of the apertured stationary plate and the movable slotted plate with which the coin stop pins cooperate, and illustrating the adjustability of the coin stop pins for changing the number of coins required to be used to operate the timer.

As best shown in FIG. 17, the coin stop pin 176 comprises a head portion on the rear end of the pin and which is designated 178, which is joined to a relatively long shank portion 180 and at the forward end of this shank portion are the aligned cross arms 182 positioned rearwardly from the tip or forward end of the pin which is designated 184.

The tip 184 of each pin is designed to be selectively engaged in or extended through one of a series of vertically spaced apertures 186 formed through the plate 48 in a line paralleling the notched slot through which the shank 180 of the pin is extended and each vertical row of apertures 186 opens into a coin station channel as shown in FIG. 4.

The shank 180 of each coin stop pin is encircled by a coil spring 188 interposed between the cross arms 182 and the forward side of the pin plate 156. When the tip 184 of a pin is extended through an aperture 186, it will be pressed forwardly until stopped by the cross arms 182 and the tip is of sufficient length to project into the coin station channel, and when so projected, it functions to stop and support a coin at a selected elevation in the channel.

When it is desired that each coin station channel be completely filled with the coins in order to effect the operation of the mechanism, then each pin 176 associated with a notched slot will be set to have its tip extended forwardly through the lowermost one of the apertures 186 with which it is associated.

If a lesser number of coins are required in the coin station channels, then the stop pin associated with the selected channel or channels can be readjusted by pulling the pin rearwardly against the resistance of the spring 188 to extract the tip 184 from the aperture and the shank of the pin can then be slid up or down in its slot to the desired new location and then shifted laterally to engage the shank in the newly selected notch 174, as is illustrated in FIG. 17.

Located beneath the unit 46 and the pin plate 156, and extending across the width of the mechanism between the frame side bars 34, is a coin collection box 190 and paralleling the forward side of this box and extending forwardly therefrom is the coin return tray 192. The box 190 and tray 192 are divided or separated by the vertical wall 194, such wall forming the back of the tray 192 and the forward side of the coin box 190.

As shown in FIG. 1, the coin return tray projects forwardly through the opening 22 in the cabinet wall 10.

The division wall 194 between the tray 192 and the coin collection box 190 is positioned in a vertical plane rearwardly of the open lower ends of the coin station channels and the space 148 through which rejected and improper coins descend. Accordingly, coins discharged downwardly from the channels or discharged downwardly from the space 148 will drop into the coin return tray 192 as shown in FIG. 11.

After a machine with which the coin chute mechanism is connected has completed its operation and the coins to be collected are discharged, by the means about to be described, from their channels, they are deflected into the coin collection box by means of the chute panel 196. This panel extends across the full width of the coin collection box and it has the portion 198 of its upper edge angled rearwardly slightly as shown.

Secured to each side edge of the chute panel in the angled portion 198 thereof, is a laterally extending pivot pin or trunnion 200 which is pivotally mounted in a bearing sleeve 202 secured to the adjacent frame side bar 34 as best seen in FIG. 3.

The top edge of the angled portion 198 of the chute panel carries a camming rib 203, the function of which is about to be described.

At each side edge the plate 156 has secured thereto a thrust plate 204, which projects rearwardly from the plate 156 and also extends downwardly below the plate as shown. These thrust plates overlie and extend across the camming rib 203 and in the normal position of the chute panel 196 the angled upper edge portion 198 thereof has a forwardly inclined position as shown in FIGS. 4, 7, 8, and 9, and the camming bar is spaced from or out of contact with the thrust plates 204, as is shown in these figures.

The portion 198 also normally extends across the open lower ends of the coin station channels whereby the release of coins from these channels will result in the coins dropping onto the chute panel and being guided downwardly and rearwardly into the collection box as shown in FIG. 9.

Means is provided, however, whereby coins can be released from the coin station channels and returned to the patron by way of the tray 192 at any time before the last coin is introduced into the mechanism. This means comprises a solenoid 206 connected in an electric circuit with the push button 18 which is available to the patron from the front of the machine. This solenoid has the armature core 208 coupled to the upper edge portion 198 of the chute panel above the pivots 200 so that when the solenoid is energized and the armature 208 is retracted, the top part of the chute panel will be pulled rearwardly into the substantially vertical position shown in FIG. 11 and the camming rib 202 will be forced against the bottom edges of the thrust plates 204 and shift the entire pin plate 156 upwardly. This will elevate the rear end portions of the coin stop pins 176 as illustrated in FIG. 9, fulcruming one of the arms 182 against the plate 48 and thereby withdrawing the tips 184 of the pins from the coin channels and removing the support for the coins in the channels and allowing them to drop down into the coin return tray as shown in FIG. 11.

Upon de-energization of the solenoid 206 the armature will be projected by suitable means such as a spring which may be housed within the body or passage in the solenoid, to swing the chute panel back to its original position where the camming rib of the panel will be forwardly of the coin station channels as illustrated in FIGS. 8 and 9 so that coins released from the channels will then fall upon the top of the chute panel and be discharged rearwardly into the collection box 190.

In describing the operation of the present invention, it will be assumed that coins of 25-cent denomination are required to be used, or tokens of corresponding size and weight, and that all of the coin station channels must be filled to initiate operation of the timer and the machine being rented for use by a patron.

Since all of the coin station channels must be filled, as stated, each of the coin stop pins 176 will be set in the lowermost position in its slot in the pin plate 156 as shown in FIG. 2. Thus the tips of the stop pins will project into their respective coin station channels as illustrated in various figures of the drawings such as FIGS. 3, 4, 5, 8, and 10.

All of the stop and deflector arms 126 will be set in the position shown in FIG. 13 so that the tail pieces 136 thereof will project into their respective coin station channels as shown in FIG. 4. Likewise the coin reject and throw-out arm 138 will be set in the position shown in FIGS. 4 and 15.

The lock-up arm 114 will be retracted as illustrated in FIGS. 5 and 12.

The first coins introduced into the coin receiver 100 will pass directly downwardly into the first coin station channel 56, hitting the sloping top edge of the tail piece of the stop and deflector arm 126 and kicking it back so as to pass on down until it is brought to rest upon the tip of the stop pin at the bottom of the station channel as illustrated in FIG. 4. The succeeding coins will stack up as illustrated until the last one to be introduced into the first station, illustrated in FIGS. 4 and 6 as the sixth coin, comes to rest upon the top of the fifth coin and in that position it will only partially pass the tail piece 136, thereby oscillating the stop and deflector arm 126 to project the nose portion 134 into the channel and hold it in this position.

The next coin introduced into the coin receiver will hit the top of the nose 134 and since the position of the stop arm in this station and in the succeeding stations is slightly to the left of the center of the channel, the coin will hit off center and be deflected to the right and caused to pass through the first gate 72.

The deflector coin cannot pass through the next gate since this next gate, 74, is lower than the gate 72 and also the rib 70 extends downwardly to a position where the coin will hit this rib as it moves to the right and thus be caused to drop into the second coin station channel. This channel will then fill to the amount of five coins as illustrated or any number for which it may be set and this process will be repeated to effect the filling of the third coin station channel with the four coins illustrated in FIG. 6.

Since in this description of the operation of the machine it is being assumed that sixteen of the coins must be inserted to initiate starting of the timer, one coin only must be introduced into the last station to bring about this action. Accordingly, the last coin introduced will take the course indicated by the broken eliptical lines shown in FIG. 6 until it passes through the last gate 76 and drops down to the lower end of the fourth station channel.

If the patron of the machine discovers at this point that he has run out of coins or tokens and does not have the last one to start the mechanism and wishes to have all of the inserted coins or tokens returned, he can have the coins or tokens returned by pressing the switch button 18 thus bringing about the action herebefore described.

Figure 16:
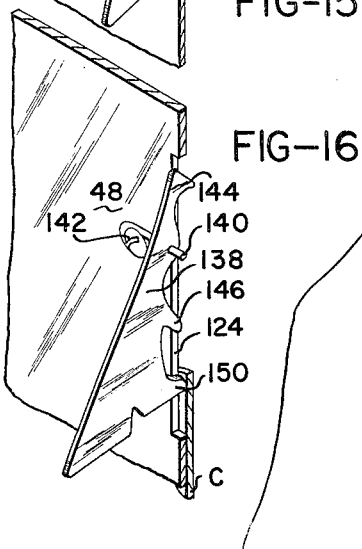
FIG. 16 is a perspective view corresponding to FIG. 15 and showing the coin throw-out arm made functional by a coin engaging the bottom end of the arm whereby additional coins will be thrown out by engaging the forwardly positioned top end of the arm.

If the last coin or token is introduced, however, and passes downwardly into the fourth station channel, it will strike the tail piece 150 of the coin reject and throwout arm 138 and cause this arm to swing rearwardly at its lower end to the position shown in FIG. 16, thereby projecting the nose 144 forwardly beyond the forward face of the plate 48.

Any subsequent coin which may now be introduced into the mechanism will move across through the path illustrated in FIG. 6 and pass down into the last station channel and engage the inclined top edge of the nose 144 and be deflected forwardly through the opening 96 into the return space or passage 148, passing downwardly into the coin return tray 192.

The last coin to enter the fourth station channel will be stopped in the position shown in FIG. 8. Here, as illustrated, the coin holds the reject arm 138 in the position shown and it presses against and moves rearwardly the switch arm 154 which closes an electric circuit having the timer 16 therein, thus starting the timer and initiating operation of the machine being rented.

After the last coin has been dropped, effecting the closing of the starting switch 156, the circuit having the coin return button 20 and solenoid 206 therein, is opened so that no return of the coins can be effected by pushing the button 20.

All of the coins are retained in the position shown in FIGS 1 and 6 until the completion of the timing cycle by the timer 16. Thus, an attendant having charge of the mechanism can observe the coins through the window in the front wall of the machine cabinet to see that proper tokens or proper coins have been used.

If coins of smaller size than required or tokens of lighter weight or smaller size are used by the patron, such improper coins or tokens when they enter any one of the first three station channels, will engage the forwardly and downwardly extending tail pieces of the arms 126 and be deflected forwardly into the return space or passage 148. The larger and heavier size coins will, however, in engaging these tail pieces, overcome the weight 132 and swing the arm so that the proper coin can pass.

Any improper coin entering the last station channel will strike the downwardly and forwardly inclined top edge of the tongue 146 of arm 138 and likewise be deflected into the return passage 148.

After the timer has operated for the selected period of time, it will function to energize the pin plate elevating solenoid 160. As the pin plate 156 is moved upwardly, it will lift the outer ends of the coin stop pins 176, rocking them in the same manner as when the camming rib 203 of the chute panel does when it is swung rearwardly to engage the thrust plates 204, as hereinbefore described. However, when the pin plate is raised by the solenoid 160, the chute panel 196 will be in the position shown in FIG. 9 so that the released coins will drop onto the top of this panel and be discharged into the collection box. Simultaneously with the elevating of the pin plate, pressure will be applied upwardly against the shoulder 118 of the lock-up arm 114. This will oscillate this arm to project the nose 116 forwardly through the slot 108 and into the upper part of the first station channel so long as this arm 114 is held in the stated position by the elevated pin plate.

If the mechanism is to be reset so as to require the use of a different number of coins as, for example, a smaller number than those illustrated, the coin stop pins 176 will be shifted to different desired elevations in their respective slots and when so shifted they will then be engaged in the openings 186 with which they are aligned. The functioning of the mechanism would then be the same as has been described hereinbefore.

While any suitable timing mechanism and electric circuitry may be employed for actuating the solenoid 160 and maintaining the same energized for the proper length of time to permit all of the coins to be discharged into the coin box, the timer here diagrammatically illustrated is shown as effecting the transmission of electric current from the power line to the machine and after functioning for the desired period of time it will effect the transmission of an electric impulse to the solenoid 160 and at the same time open the circuit.

The second or modified embodiment of the present invention, hereinbefore referred to, is illustrated in FIGS. 21 to 31, iinclusive.

In these figures the numeral 300 designates the modified apparatus as a whole.

In the front view forming FIG. 21 the numeral 302 generally designates a window frame resting upon the top of a front base panel or wall 304.

A top front panel 306 forms a forwardly and upwardly inclined top section of the frame, while the numeral 308 designates the top rail of the frame part.

The frame 302 is connected to the lateral or side walls 310 while the numeral 312 designates a back wall plate generally corresponding to the hereinbefore referred to plate 48.

The frame 302, top rail 308, side walls 310, and back wall 312 generally form a housing or casing chamber 314 for parts of the apparatus.

The frame 312 has therein the transparent window panel 316 which may be of transparent plastic or glass as desired.

The base panel 304 is provided with an access opening 318, giving access to a coin return tray 320 supported at the rear of the panel 302.

This coin return tray has its front edge 322 disposed below the access opening 318 and a rear top edge 324 at an elevation above the bottom of the opening 318 and also located a substantial distance rearwardly of the base panel and rearwardly widened lower flange extensions 326 of the back wall plate flanges 328 which are integral with the top and sides of the back wall plate, form lateral walls for the coin return tray.

Rearwardly of the coin return tray is the coin receiving box 330, the top of which lies below the edge 324 of the coin return tray whereby coins may be deflected thereinto in the manner hereinafter described.

The access opening 318 leading to the coin return tray is closed by the access door 332 which is pivotally supported above the top of the opening on the inner side thereof to swing closed by gravity.

The numeral 336 generally designates the transparent wall panel corresponding to panel 78 of the first described embodiment of the invention. This panel 336 is secured within the housing chamber between the lateral walls 310 and in spaced parallel relation with the window panel 316 and with the back wall plate 312. Thus there are formed upon opposite sides of this transparent panel the vertical coin rejection space or passage 338 and the narrower space 340 in which are located, between the panel 336 and the wall 312, the spaced parallel vertical ribs 342, 344, and 346, and their associated spaced, aligned ribs 348, 350, and 352.

As shown in FIGS. 25, 28, 29 and 30, the transparent panel 336 and the back wall plate 312 have bottom edges in approximately the same horizontal plane and located a substantial distance above the rear top edge 324 of the coin return tray, thereby forming a relatively wide space between the lower edges of the wall and transparent panel and the rear edge of the coin return tray, which space or opening is generally designated 354. The purpose of this opening will be hereinafter set forth.

The ribs 342, 344, and 346 correspond to the hereinbefore described ribs 64, 68, and 72, respectively, while the ribs 348, 350, and 352 correspond, respectively, to the hereinbefore described ribs 66, 70, and 74, and the lower ones of the ribs form first, second, third, and fourth coin receiving stations or slots, designated 356, 358, 360, and 362. These stations receive coins from the coin deposit slot, about to be described, in the same manner as the first described stations 56, 58, 60, and 62, the last station 360 receiving the final coin which starts the operation of the apparatus and prevents the patron from repossessing the coins or tokens and also causing any subsequent coins or tokens inserted in the apparatus, to be rejected.

As illustrated, the first coin station 356 is of a length to receive the greater number of coins, the succeeding stations receiving diminishing numbers until the last station which receives only one and the top rail 308 is provided, directly above the first station and in alignment therewith, with the coin admission slot 364.

The numeral 366 generally designates the coin receiver which, as shown in FIG. 21, comprises the elongate body 368 which extends across the top of the frame structure and is provided at the end remote from the coin slot 364, and in the front side of the body, with the opening 370 leading into the inclined passageway 372 which terminates at the opposite end of the receiver body over and delivers a coin to the opening 374, from which it passes into the slot 364.

By the provision of the outwardly inclined top front panel 306 there is formed at the top of the apparatus, a coin selector chamber 376, the rear part of which includes the upper portion of the housing chamber 314.

As shown in FIGS. 23 and 24, the top edge of the transparent inner wall 336 terminates in the lower part of the coin selector chamber 376 or slightly above the top of the window panel 316 and the top edge of the wall 336 is bevelled on the rear side as indicated at 378.

Within the coin selector chamber 376 is a coin selector unit indicated as a whole by the reference numeral 380. This unit comprises the relatively long plate 382 which has a top edge which is secured to the underside of the top rail 308 in line with the forward side of the inclined coin conducting passageway 372, and extends downwardly and rearwardly and terminates above the bevelled edge 378 of the wall 336 as shown in FIGS. 23 and 24.

The plate 382 is rigidly mounted and has formed therein the opening 384 which is of a width greater than the diameter of the proper coin, such as a twenty-five-cent piece, or the proper token, to be used in the apparatus. Thus a coin or token of the proper diameter, when introduced through the slot 364, will drop upon and slide downwardly and rearwardly into the space 340 from which it will pass either into the first station 356 or into one of the succeeding stations depending upon either the number of coins which may be in the first or second or third station or depending upon the setting of a coin stop pin, hereinafter referred to, and corresponding to the pin 176.

A coin of the improper size or value which may be inserted into the apparatus and passed downwardly through the slot 364, such as a coin of smaller diameter than a twenty-five-cent piece or of a smaller diameter than the required token, will pass directly downwardly through the opening 384 and into the coin reject space or passage 338. This space or passage corresponds to the space or passage 148 of the first described embodiment.

It will also be seen upon reference to FIGS. 25, 28, 29 and 30 that any rejected coin or token will pass directly downwardly into the coin return tray 320 from which it may be retrieved by the patron pushing the access door 332 rearwardly as shown in FIG. 28.

In order to prevent any accidental deflection of an unauthorized coin or token, forwardly into the space 340, a pivoted flap 386 is suspended in line with the rear side of the passageway 372.

This flap is of a width and length to normally hang down and extend through the opening 384.

When a coin or token of the proper size and denomination, here designated in FIG. 24 and in other figures by the reference character C, is introduced into the apparatus and passes downwardly onto the plate 382, it will slide rearwardly on the plate and swing the flap 386 rearwardly on its pivot 388 as shown in FIG. 24 so that the flap will not interfere with the passage of a coin of proper size but it will prevent the accidental passage of a smaller coin rearwardly into a coin station.

Interposed between the transparent plate or wall 336 and the window panel 316 is an inclined partition strip 390 which at its high end lies beneath the coin selector unit, as shown in FIG. 21 and at its low end it terminates substantially at the elevation of the upper end of rib 346.

At the upper end of the fourth coin station or slot 362 a downwardly and forwardly directed deflector is attached to the front side of the transparent wall panel 336. This deflector, designated 392, has a relatively long lower end portion 394 which is in relatively closely spaced parallel relation with the window panel and this lower portion 394 extends across a vertical slot 396 formed in the transparent wall panel, as illustrated in each of FIGS. 25, 28, 29, and 30.

The numeral 398 generally designates the pin plate, corresponding to the plate 156 of the first described embodiment and which carries a plurality of coin stop pins, each of which is generally designated 400, adapted for vertical adjustment to one of a number of selected positions for changing the number of coins required to be deposited into the apparatus to effect the operation thereof. Each of these pins, when vertically adjusted, has the nose end or tip 402 thereof inserted through one of the vertical row of apertures 404 in the back plate 312 for projection into a coin station or slot as hereinbefore described.

The pin plate 398 is suspended from the armature of electromagnet 406 and it will be understood, from a consideration of the first described structure, that when this electromagnet is energized the plate 398 will be pulled upwardly to oscillate the pins 400 to effect the release of coins located in the coin stations. However, in this second embodiment of the invention the electromagnet 406 would only be energized to release the coins after the completion of the operation of the timer, here shown in its own circuit and designated 408 and in which timer circuit is connected the starting switch for the machine under the control of the timer, which switch is generally designated 410 and is located upon the back wall of the apparatus to have the actuating arm 411 thereof extended or projecting through a slot in the back wall and into the lower part of the fourth coin station 362, as illustrated in FIGS. 21, 26, and 27.

The numeral 412 generally designates the coin chute panel by means of which coins, released after the stopping of the operation of the apparatus, pass downwardly from the coin stations and are directed rearwardly into the coin box 330. This panel 412 extends across the length of the coin return tray and has its bottom edge pivotally supported at 414, between the wall plates 326, for back and forth oscillation between a position where its top edge is located substantially below the bottom edge of the transparent wall panel 336, as shown in FIG. 25, to a position where its top edge will press upwardly against the underside of the camming arm 416, attached to the plate 398, as shown in FIG. 29, to raise the plate and effect the release of coins in any one of the first three stations, for return to the patron by way of the coin return tray 320.

As will be hereinafter apparent, however, this oscillation of the chute panel 412 cannot be made to occur to effect the release of coins from the coin stations, after the last coin required for completing the number required for starting the apparatus, has been dropped into and reached the lower end of the fourth station 362.

Manual elevation of the pin plate 398 may be effected prior to the insertion of the last coin into the apparatus, or before the required last coin has passed into the fourth station, by means of a vertically reciprocable rod 418, shown most clearly in FIGS. 21 and 22, and shown in section in FIGS. 26 and 27. The upper end of this rod 418 passes into the housing chamber through a wall opening 420 and upwardly on the inner side of the wall where it has loose connection with a pivoted rock arm 422 attached to a suitable supporting rock shaft, not shown, and which shaft in turn is attached at its forward end to the manual actuating lever 424 which is accessible to the patron, upon the front of the apparatus. When the lever 424 is oscillated, the rod 418 may be vertically reciprocated.

The lower end of the rod is pivotally connected as at 426 to a short arm 428 which extends upwardly and rearwardly and is rigidly secured or attached to the forward or underside of the chute panel 412 as shown in FIG. 22 and other figures. Consequently it will be seen that when the rod 418 is pulled upwardly the panel 412 will be oscillated from the position shown in FIG. 25, rearwardly to bring the top edge of the panel against the underside of the camming arm 416 to effect upward movement of the pin plate 398.

When the rod 418 has been moved downwardly to the maximum extent as shown in FIG. 25, the upper edge of the panel will lie slightly forwardly of the rear face of the transparent wall panel 336 and consequently any coins released from the coin stations will slide downwardly and rearwardly into the coin box as previously stated. When the panel 412 is swung rearwardly, however, as shown in FIG. 29, coins released from the stations will be delivered into the coin return tray.

Pivotally supported on the wall plate 312, at 430, is the coin throw-out arm 432 which corresponds to the arm 138 of the first described structure. This arm has an upper end terminating in a forwardly directed nose 433 and at its lower end it has the forwardly projecting toe 434 and the arm is supported with the major portion thereof located rearwardly of the plate 312, and in the plane of a vertical slot 438 in the plate 312 whereby the nose and toe may move into and out of this slot when the arm is oscillated in the manner hereinafter stated. Also it will be seen that the nose 433 is positioned to extend across the fourth station or slot 362 toward the vertical slot 396 whereby, when it has been so extended across the station slot 362, any coin passing downwardly into the station slot 362 will strike the forwardly and downwardly inclined top edge of the nose 433 and be deflected through the opening or slot into the coin return space 338.

The lower end of the arm 342 is of substantial width whereby there is formed a rearwardly and downwardly projecting tailpiece 440 and the lower edge of this tailpiece overlies the lateral projection 442 of the pin carrying plate 398, which projection, upon the upward movement of the plate 398, will oscillate the arm 432 to project the nose 433 forwardly as illustrated in FIG. 29.

As illustrated in FIG. 29, when the chute panel 412 is oscillated rearwardly to effect the return of coins into the tray 320 and the pin plate is thereby shifted upwardly to retract the pin or pins 400, as illustrated, the projection 442 on the pin plate will engage the under edge of the tailpiece 440 and nose 433 of the throw-out arm will be extended into the slot 362. Accordingly, any coins which then may be passed into the slot 362 will strike the nose 433 and be projected laterally into the coin return area 338 to pass down into the tray 320.

The numeral 444 generally designates a safety means. This safety means comprises a vertical wire 446 positioned in a recess 448, see FIGS. 26 and 27, formed in the forward side of the wall panel 336 and communicating at its upper end with an aperture 450 in the wall panel, which is in line with the toe 434 of the throw-out arm 432.

The wire 446 is adapted to turn on its longitudinal axis and at its upper end it has an angularly extending finger 452 which passes through the aperture 450 as shown in FIGS. 26 and 27. This finger is in contact with the toe 434 at all times except when a coin has passed into the lower part of the fourth station. Such coin then will swing the lower end of the throw-out arm rearwardly, projecting the nose 433 farther toward the front across the passage 362 and be interposed between the toe and the end of the finger 452 as shown in FIG. 30.

At its lower end the wire 446 carries an angulated arm 454 which extends rearwardly for contact with the forward or underside of the panel 412.

A spring 456, mounted upon the wall panel 336, engages the finger 452 and normally urges it rearwardly toward the toe 434 of the arm 432.

As hereinbefore stated, when all but the last one of the required number of coins have been introduced into the receiving station slots, if the patron of the machine wishes to get the coins back, this can be done by rocking the lever 424. However, after the last coin has been introduced and is in the position shown in FIG. 30, the coin effects the lateral oscillation of a lock-up lever 458, shown in FIGS. 26 and 27. As shown, this lever has an end portion 460 which extends through a slot 462 in the side wall 310, to be engaged by the coin to effect the outward rocking of the lever on a suitable pivot mounting 464 and the lower end of the lock-up lever carries an arm 466 terminating in a finger 468 which moves into an aperture 470 in the panel 412 as shown in FIG. 30, thereby securing the panel against movement.

As shown in FIG. 25, when the panel 412 has been swung to its forward position it will engage the angulated arm 454 and effect the swinging of the finger 452 forwardly against the tension of the spring 456. The throw-out arm can then swing forwardly at its lower end to retract the nose 433 from the passage 362.

Any rearward movement of the panel 412, such as might be occasioned by the pressing of the access door against the underside of the panel as shown in FIG. 28, will release the pressure on the angulated arm sufficiently to permit the finger 452 to be pressed rearwardly by the spring, against the toe 434 of the throw-out arm, to move the latter to the position shown in FIG. 28 where any coins moving down the station slot 362 will be deflected into the return space.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents are therefore intended to be embraced by those claims.

What is claimed is:

1. Coin chute mechanism, comprising in combination with electric circuitry for connection with an electrically operated machine, means forming a mechanism housing, means in said housing forming a first station channel having a coin entrance end for receiving a disc such as a coin, means in the housing forming a last station channel having a coin entrance end for receiving another disc, means for introducing a first disc into the housing and for directing the same into said first station channel through the entrance end thereof, means movably supported by the housing in the said entrance to said first station channel actuated to a position by a disc entering the first station channel, for preventing another disc from entering the first station channel and deflecting said other disc into the last station channel through the entrance to the latter, means actuated by a disc so deflected into the last station channel for effecting energization of said circuitry for the delivery of electrical energy to a machine, and means for effecting the release of a disc from the first station channel before actuation of said means by a disc entering the last station channel.

2. The invention according to claim 1, wherein said circuitry includes therein timing mechanism operating to shut off electrical energy to the machine after a predetermined period, movable means for effecting release of discs from said station channels into a collection area, and electrical means in said circuitry energized after the said shutting off of electrical energy to the machine and operatively connected to said movable means for activating the latter for the said release of discs.

3. The invention according to claim 1, wherein said last means is electrically operated.

4. The invention according to claim 1, wherein the last means is manually mechanically operated.

5. The invention according to claim 1, wherein said housing includes a transparent front wall covering said stations whereby observation of discs in the stations may be had.

6. Coin chute mechanism comprising a housing structure including front and back walls, a top part and a lower part, at least two elongate, vertical coin receiving channels therein providing a first coin station channel and a last coin station channel, the first coin station channel being of materially greater length than the last station channel, means in said housing top part providing a coin admission slot arranged to deliver coins into the said first station channel only at the top thereof for edge-on-edge stacking therein, said station channels having open unobstructed bottom ends, shiftable means for and within each station channel for releasably supporting a coin at a selected location therein for discharge through the open bottom thereof, means for adjusting the position of the said shiftable means vertically of and within the first station channel for changing the number of coins introducable thereinto, means actuated by the last coin of a predetermined number entering the first station channel for deflecting into the last station channel a next coin passing through said admission slot, an electric switch having a closing finger located in the last station channel adjacent to and independent of the shiftable coin supporting means therein to be actuated by and held in switch closing position by a coin entering the last station channel, and means for rejecting from the last station channel a coin entering after the said switch finger has been actuated.

7. The invention according to claim 6, with means for effecting movement of all of the said shiftable coin supporting means simultaneously for discharge of the coins from said station channels through the open bottom ends thereof.

8. The invention according to claim 6, wherein said shfitable coin supporting means comprise pin members supported behind said housing back wall and each having an end projecting through an aperture in said back wall into its respective coin station channel and the said pin member support being vertically movable to rock the pin members in a direction to effect the withdrawal of the said projecting ends thereof from beneath a supported coin.

9. The invention according to claim 6, with a coin return tray and a coin box disposed in said housing lower part, said coin return tray being positioned to receive coins discharged from the open lower ends of said station channels, means forming a rejected coin passage also having an open lower end positioned to discharge rejected coins into said tray, a deflector panel supported in said housing lower part for movement between a first position in which coins discharged from said station channels will be deflected into said coin box and a second position in which it permits coins to pass into the coin return tray, means for effecting movement of said panel to said second position before a coin has actuated said switch finger in the last station channel, means for shifting the said releasable coin supporting means when said panel has been moved to said second position, and means for holding said panel in the said first position until all coins have been discharged from said station channels.

10. Coin chute mechanism, comprising a housing structure including front and back walls, a top part and a lower part, at least two elongate, vertical coin receiving channels therein providing a first coin station channel and a last coin station channel, the first coin station channel being of materially greater length than the last station channel, means in said housing top part providing a coin admission slot arranged to deliver coins into the top of said first station channel for edge-on-edge stacking therein, said station channels having open bottom coin discharge ends, said front and back walls having spaced, vertical ribs therebetween and forming said station channels, a plate disposed vertically and rearwardly of said back wall and having at least two vertical slots each adjacent to a coin station channel, means supporting said plate for vertical movement, said first coin station channel having a vertical series of apertures opening thereinto through the back wall and aligned with one plate slot, said last coin station channel having an aperture opening thereinto through the back wall and aligned with the other plate slot, a first coin supporting key in and movable longitudinally of said one plate slot and having an end for selective detachable engagement in one of said apertures opening into the first station channel, means for supporting said first key in engagement in a selected aperture, a second coin supporting key in said other plate slot and having an end detachably engaged in the aperture opening into said last coin station channel, means for vertically shifting said plate, means for effecting retraction of said ends of the keys from their respective apertures upon vertical shifting of said plate to release coins supported by the said ends of the keys for discharge of released coins through the open bottom ends of the coin station channels, means for deflecting into the last station slot a coin passing through said admission slot after the first station channel has received the predetermined number of coins, an electric switch actuating means positioned to be actuated by a coin received in the last station channel, means for rejecting a coin entering the last station channel after said switch actuating means has been actuated, means for releasing coins from the first station channel and means for preventing the said releasing of coins from the first station channel after a coin has been received in the last station channel and has actuated the said switch actuating means.

11. The invention according to claim 10, wherein the said means for effecting the vertical shifting of said plate is electrical.

12. The invention according to claim 10, wherein the said means for effecting the vertical shifting of said plate is a manually actuatable means.

13. The invention according to claim 10, wherein the said means for effecting retraction of said ends of the keys from their respective apertures upon vertical shifting of said plate comprises a cross arm carried by each key adjacent to the said end thereof and spring means interposed between the cross arm and the said plate and normally urging the cross arm against said back wall, said plate, upon vertical movement, effecting the fulcruming of the key arms against the back wall to effect the said retraction of the key ends from their respective apertures.

14. The invention according to claim 10, with a coin box and a coin return tray in said housing lower part positioned to receive coins discharged from said channels, an oscillatable deflector panel in said housing lower part having a first position in which coins discharged from said channels will be directed into the coin box, and a second position in which coins discharged from said channels will be permitted to pass into said return tray, the said means for vertically shifting the key supporting plate being an electrical means operatively connected with said deflector panel and when energized oscillating the panel from said first position to said second position, and means whereby said panel when so moved by said electrical means will effect vertical movement of said plate.

15. The invention according to claim 14, wherein said panel has a top edge portion which when the panel is oscillated by said electrical means moves in an arc relative to the lower portion of said plate and engages a part of said plate and effects an upward thrust to the plate.

16. The invention according to claim 10 with a coin box and a coin return tray in said housing lower part positioned to receive coins discharged from said channels, an oscillatable deflector panel in said housing lower part having a first position in which coins discharged from said channels will be directed into said coin box and a second position in which coins discharged from said channels will be permitted to pass into said return tray, the said means for vertically shifting the keys supporting plate being a manually actuated means, a rock lever carried on the housing, a rod operatively connected to said lever for longitudinal shifting, an arm carried by said rod and attached to said panel to oscillate the latter upon longitudinal shifting of the rod from said first position to said second position, and means whereby the said panel, when so shifted, will effect vertical movement of said plate.

17. The invention according to claim 16, wherein said panel has a top edge portion which, when the panel is oscillated by said manually actuated means, moves in an arc relative to the lower portion of said plate and engages a part of said plate and effects an upward thrust to the plate.

18. Coin chute mechanism, comprising a housing structure including front and back walls, a top part and a lower part, at least two elongate vertical coin receiving channels therein providing a first coin station channel and a last coin station, the first coin station channel being of materially greater length than the last station channel, means in said housing top part providing a coin admission slot arranged to deliver coins into the top end of said first station channel for edge-on-edge stacking therein, said channels having open bottom coin discharge ends, said front and back walls having spaced, vertical ribs therebetween and forming said station channels, a plate disposed vertically and rearwardly of said back wall and having at least two vertical slots each adjacent to a coin station channel, means supporting said plate for vertical movement, said first coin station channel having a vertical series of apertures opening thereinto through the back wall and aligned with one plate slot, said last coin station channel having an aperture opening thereinto through the back wall and aligned with the other plate slot, a first coin supporting key in and movable longitudinally of said one plate slot and having an end for selective detachable engagement in one of said apertures opening into the first station channel, means for supporting said first key with said end thereof engaged in a selected aperture, a second coin supporting key in said other plate slot and having an end detachably engaged in the aperture opening into said last coin station channel, means for vertically shifting said plate, means for effecting retraction of said ends of the keys from their respective apertures upon vertical shifting of said plate to release coins supported by the keys for discharge through the open bottom ends of the coin station channels, means for deflecting into the last station channel a coin passing through said admission slot after the first station channel has received the predetermined number of coins, an electric switch actuating means positioned to be actuated by a coin received in the last station channel, means forming a reject passage between said coin station channels and said front wall and leading downwardly into said coin return tray, said coin station channels being of a width to relatively snugly receive a coin of a predetermined size, a coin stop and deflector arm pivoted on said back wall adjacent to the top of the first coin station channel and having a top nose end and a weighted bottom tail end for extension into the adjacent coin station channel through a back wall slot, said tail end normally projecting into the coin station channel and acting to deflect a coin of smaller than correct size forwardly from the coin station channel into the reject passage, said stop and deflector arm being located to have its tail end engaged by the last one of the said predetermined number of coins introduced into the first station channel, to oscillate the arm and project the nose end into the station channel and said nose when so projected into the station channel forming said means for deflecting a coin to the last station channel, means engaged and actuated by a coin passing into the last station channel for obstructing entrance of a subsequent coin into the last station channel and ejecting said subsequent coin into the reject passage, means for releasing coins from the first station channel, and means for preventing the said release of coins from the first station channel after a coin has been received in the last station channel and has actuated said switch actuating means.

19. The invention according to claim 18, with means operated by said plate when the latter is shifted vertically, for preventing introduction of a coin into the mechanism through said coin admission slot.

20. The invention according to claim 19, wherein said last means comprises a lock-up arm pivotally supported on said back wall and having a nose extensible through a slot in the back wall between the coin admission slot and the top end of the first coin station channel and having a shoulder overlying the top edge of the plate to be engaged and lifted by the latter.

21. Coin chute mechanism for connection with electric circuitry of an electrically operated machine comprising in combination, a housing structure including a front wall, a back wall, a top part and a lower part, an inner wall panel between and spaced from said front and back walls, spaced parallel vertical ribs between said panel and front wall forming at least two coin station channels, one channel being of greater length than the other, the channels being open at their top ends for receiving a coin and open at their bottom ends for coin discharge, said one channel being adapted to receive a predetermined number of coins stacked edge-on-edge, the other channel being designed to receive a single coin forming the last coin of a number required for operating the mechanism, the space between said inner wall panel and the front wall forming a coin reject passage open at its bottom, a coin receiver box and a coin return tray located below the open lower ends of said coin station channels and said coin reject passage, shiftable means supported behind and operatively coupled with said back wall and lying in part in said coin station channels for supporting a coin in the lower ends of said station channels, the coin supporting means for said one station channel being vertically adjustable to a number of coin supporting positions whereby the number of coins introducable into the said one channel may be varied, a coin admission slot in the housing top part for directing an introduced coin of a proper denomination into the open top end of said one station channel, means in said one station channel for deflecting into the said other station channel a coin passing through said admission channel after said one station slot has received a predetermined number of coins, means whereby a coin of smaller size than one of proper denomination, when introduced into said coin admission slot, will be passed into said reject passage and directed into the coin return tray, a deflector panel having a lower edge pivotally supported adjacent to the rear of said coin return tray and oscillatable to swing its top edge from a first position in which the deflector panel will deflect coins discharged from said station channels into said coin box, to a rearwardly swung second position to permit coins to pass from the first station channel into the coin return tray, an electric switch actuating means positioned in said other coin station channel to be actuated to switch closing position by a coin passing into the latter channel, means for manually effecting oscillation of said panel to said second position, means for effecting shifting of the coin supporting means for release of coins from the first station channel to pass into the coin return tray upon said manually effected oscillation of said panel to said second position, means actuated by a coin upon movement of said switch actuating means for locking said panel in the said first position against manually effected oscillation, and electrical means operatively coupled with said shiftable coin supporting means whereby said electrical means when energized effects shifting of the coin supporting means for release and discharge of coins from the said coin station channels onto said locked panel for deflection therefrom into the coin box.

22. The invention according to claim 21, with a vertically disposed plate supported behind said back wall for vertical movement, said shiftable coin supporting means being carried by said plate, and said electrical means comprising a solenoid supported on the housing and having a depending core connected to and from which said plate is suspended, and said pivoted panel when manually oscillated to said second position functioning as the said means for effecting the shifting of said coin supporting means by engaging a part of said plate and elevating the plate.

23. The invention according to claim 21, wherein said coin admission slot is directed downwardly toward the open top of said reject passage, an inclined plate below said admission slot angled rearwardly and terminating above said first coin station channel for directing a coin of proper size into the first station channel, and said means whereby a coin of smaller size will be passed into the reject passage comprising an opening in said inclined plate to pass the smaller coin but too small to pass a larger coin of proper denomination.

24. The invention according to claim 21, wherein the said inner wall panel has a coin reject opening located in said last coin station channel above the said coin actuated means for locking the deflector panel in the said first position thereof, said coin reject opening leading into the reject passage, a coin reject arm pivotally supported on the back wall and oscillatable through a slot in the back wall toward the inner wall panel, said arm having an upper end nose directed toward said reject opening and a lower end toe, a movable spring actuated safety means supported on the inner panel and having a finger portion extending through an aperture in the latter panel toward and for engagement with said arm toe and an angulated arm for engagement with said chute panel, said chute panel when unlocked in said first position controlling the safety means to effect holding of said coin reject arm with said nose retracted from within the adjacent station channel and said chute panel when manually moved toward said second position permitting the finger to engage said toe and move the reject arm nose into the adjacent station channel, and said reject arm toe being positioned for engagement by a coin introduced into the last station channel to oscillate the reject arm to a position in which the nose thereof extends into the last mentioned station channel.

25. Coin chute mechanism for connection with electric circuitry of an electrically operated machine, comprising, in combination, a housing, a vertical wall therein having a front side and a rear side, a plurality of vertical parallel coin channels having vertical two-part dividing ribs, the parts of said ribs being aligned and vertically spaced to form coin gates leading laterally from a first coin receiving channel to a last coin receiving channel, there being at least one intermediate channel, said coin gates being disposed at progressively lower elevations from the first channel to the last channel and of a size to pass a coin of a selected diameter, said channels being open at their bottom ends, means for introducing a coin of a a selected diameter into the housing and into the top end of said first channel, a coin actuated arm pivoted on said vertical wall at the rear of each channel and adjacent to the lower side of the gate leading laterally toward the last channel, each of said arms being aligned with a vertical slot in the wall and opening into the adjacent channel and each arm having upper and lower end portions projectable through the adjacent slot, said lower end portion only of the arm being engaged by coins passing into the channel to oscillate the arm and project the upper end portion thereof into the channel, a coin stop element for each channel, means for selectively positioning said coin stop elements in their respective channels to determine the number of coins which may stack edge-on-edge therein, said upper end portion of said arm when projected into its channel by a top coin of a stack therein functioning to deflect a next coin laterally through the adjacent gate into a next channel, means actuated by and upon entrance of a coin into the last channel for energizing electric circuitry, means for simultaneously removing all of said coin stop elements from their respective channels to permit coins therein to be discharged from the open lower ends of the channels after a predetermined period following energization of said circuitry, and means for preventing introduction of a coin into the upper end of the first channel simultaneously with the actuation of said stop element removing means, said coin stop elements being movably attached to and supported by a carrying body disposed behind said vertical wall, said carrying body being supported for vertical movement and when so moved effecting the said removal of the stop elements, and means for effecting said movement of said carrying body.

26. Coin chute mechanism for connection with electric circuitry of an electrically operated machine, comprising, in combination, a housing, a vertical wall therein having a front side and a rear side, a plurality of vertical parallel coin channels having vertical two-part dividing ribs, the parts of said ribs being aligned and vertically spaced to form coin gates leading laterally from a first coin receiving channel to a last coin receiving channel, there being at least one intermediate channel, said coin gates being disposed at progressively lower elevations from the first channel to the last channel and of a size to pass a coin of a selected diameter, said channels being open at their bottom ends, means for introducing a coin of a selected diameter into the housing and into the top end of said first channel, a coin actuated arm pivoted on said vertical wall at the rear of each channel and adjacent to the lower side of the gate leading laterally toward the last channel, each of said arms being aligned with a vertical slot in the wall and opening into the adjacent channel and each arm having upper and lower end portions projectable through the adjacent slot, said lower end portion only of the arm being engaged by coins passing into the channel to oscillate the arm and project the upper end portion thereof into the channel, a coin stop element for each channel, means for selectively positioning said coin stop elements in their respective channels to determine the number of coins which may stack edge-on-edge therein, said upper end portion of said arm when projected into its channel by a top coin of a stack therein functioning to deflect a next coin laterally through the adjacent gate into a next channel, means actuated by and upon entrance of a coin into the last channel for energizing electric circuitry, means for simultaneously removing all of said coin stop elements from their respective channels to permit coins therein to be discharged from the open lower ends of the channels after a predetermined period following energization of said circuitry, and means for preventing introduction of a coin into the upper end of the first channel simultaneously with the actuation of said stop element removing means, said penultimate means comprising a plate body disposed vertically at the rear of said vertical wall and having vertical slots corresponding in number to said channels and each slot having edge notches, said stop elements each comprising an end portion of a pin member, the said means for selectively positioning the stop elements consisting of a number of vertically spaced wall apertures through which said end portions of the pin member loosely extends, the said pin members extending between the plate body and said wall and each extending through a slot of said plate body and engaged in an edge notch of the slot, each pin member having a cross arm at the end portion thereof and engaged against the rear side of said wall, a spring member encircling each pin member between said cross arm thereof and said plate body, means supporting said plate body for vertical movement, and means whereby said vertical movement of the plate body may be effected for effecting the said simultaneous removal of the stop elements from their respective channels.

References Cited by the Examiner

UNITED STATES PATENTS

| | | | |
|---|---|---|---|
| 1,644,067 | 10/1927 | Malkin | 194—.01 |
| 1,945,343 | 1/1934 | Clayton | 194—.01 |
| 2,013,160 | 9/1935 | Lipp. | |
| 2,386,191 | 10/1945 | Bowman | 194—.01 |
| 2,600,443 | 6/1952 | Stuart | 194—10 |
| 2,604,966 | 7/1952 | Smith | 194—10 |
| 2,638,198 | 5/1953 | Wellstain | 194—10 |

FOREIGN PATENTS

| | | |
|---|---|---|
| 370,483 | 3/1923 | Germany. |
| 618,237 | 9/1935 | Germany. |

SAMUEL F. COLEMAN, *Primary Examiner.*